(12) United States Patent
Singh et al.

(10) Patent No.: US 11,087,925 B2
(45) Date of Patent: Aug. 10, 2021

(54) POWER CAPACITOR MODULE WITH COOLING ARRANGEMENT

(71) Applicant: ABB Power Grids Switzerland AG, Baden (CH)

(72) Inventors: Biswajit Singh, Ludvika (SE); Carl-Olof Olsson, Västerås (SE)

(73) Assignee: ABB Power Grids Switzerland AG, Baden (CH)

( * ) Notice: Subject to any disclaimer, the term of this patent is extended or adjusted under 35 U.S.C. 154(b) by 0 days.

(21) Appl. No.: 16/318,976

(22) PCT Filed: Oct. 26, 2016

(86) PCT No.: PCT/EP2016/075857
§ 371 (c)(1),
(2) Date: Jan. 18, 2019

(87) PCT Pub. No.: WO2018/014982
PCT Pub. Date: Jan. 25, 2018

(65) Prior Publication Data
US 2019/0287722 A1    Sep. 19, 2019

(30) Foreign Application Priority Data

Jul. 20, 2016    (EP) .................................... 16180256

(51) Int. Cl.
*H01G 4/38* (2006.01)
*H01G 2/08* (2006.01)
(Continued)

(52) U.S. Cl.
CPC .............. *H01G 4/258* (2013.01); *H01G 2/04* (2013.01); *H01G 2/08* (2013.01); *H01G 2/106* (2013.01);
(Continued)

(58) Field of Classification Search
CPC ........ H01G 4/258; H01G 4/228; H01G 4/224; H01G 4/38; H01G 4/14
See application file for complete search history.

(56) References Cited

U.S. PATENT DOCUMENTS

| 3,454,842 | A |   | 7/1969 | Wurster |           |
|-----------|---|---|--------|---------|-----------|
| 4,309,739 | A | * | 1/1982 | Schmidt | H01G 2/08 |
|           |   |   |        |         | 29/25.42  |

(Continued)

FOREIGN PATENT DOCUMENTS

| DE | 202015004662 U1   | 8/2015 |
|----|-------------------|--------|
| JP | 2005012940 A   *  | 1/2005 |

(Continued)

OTHER PUBLICATIONS

International Search Report and Written Opinion of the International Searching Authority Application No. PCT/EP2016/075857 Completed: Nov. 30, 2016; dated Dec. 14, 2016 12 pages.

(Continued)

*Primary Examiner* — David M Sinclair
(74) *Attorney, Agent, or Firm* — Sage Patent Group

(57) ABSTRACT

A power capacitor unit including a casing, first and second layers of capacitor elements wherein the first layer of capacitor elements are stacked on the second layer of capacitor elements, a first busbar assembly connected to the capacitor elements of the first layer, a second busbar assembly connected to the capacitor elements of the second layer, wherein the first busbar assembly and the second busbar assembly are arranged between the first layer of capacitor elements and the second layer of capacitor elements, a heat conducting layer provided between the first busbar assembly and the second busbar assembly, wherein the heat conducting layer is in thermal contact with the casing, thereby conducting heat from the first busbar assembly and the second busbar assembly to the casing, and wherein the (Continued)

casing is electrically insulated from the first busbar assembly and the second busbar assembly.

21 Claims, 3 Drawing Sheets

(51) Int. Cl.
    *H01G 4/258*     (2006.01)
    *H01G 4/224*     (2006.01)
    *H01G 4/228*     (2006.01)
    *H01G 2/04*     (2006.01)
    *H01G 2/10*     (2006.01)

(52) U.S. Cl.
    CPC ............ *H01G 4/224* (2013.01); *H01G 4/228* (2013.01); *H01G 4/38* (2013.01)

(56) References Cited

U.S. PATENT DOCUMENTS

| | | | |
|---|---|---|---|
| 5,367,437 A * | 11/1994 | Anderson | H01G 4/38 257/533 |
| 8,018,712 B2 | 9/2011 | Yang et al. | |
| 8,228,660 B2 | 7/2012 | Fujii et al. | |
| 2008/0265586 A1 * | 10/2008 | Like | B60R 16/04 290/38 R |
| 2010/0039748 A1 * | 2/2010 | Fujii | H01G 2/08 361/274.1 |
| 2011/0102966 A1 * | 5/2011 | Takeoka | H01G 2/08 361/301.3 |
| 2014/0286064 A1 * | 9/2014 | Kamizuma | H01G 4/258 363/123 |
| 2014/0334105 A1 | 11/2014 | Chen et al. | |
| 2015/0340157 A1 * | 11/2015 | Wen | H02M 7/003 361/328 |
| 2016/0126011 A1 | 5/2016 | Schmit et al. | |
| 2016/0172121 A1 | 6/2016 | Juventin et al. | |

FOREIGN PATENT DOCUMENTS

| | | | | |
|---|---|---|---|---|
| JP | 2005050996 A | | 2/2005 | |
| JP | 2006245170 A | * | 9/2006 | ............... H01G 2/04 |
| JP | 2009038135 A | * | 2/2009 | |
| JP | 2011054616 A | * | 3/2011 | |
| JP | 4702597 B2 | | 6/2011 | |
| JP | 2011210863 A | * | 10/2011 | |
| JP | 2012199350 A | * | 10/2012 | ............... H01G 2/04 |
| JP | WO2016002177 A1 | | 4/2017 | |
| WO | 2012013254 A1 | | 2/2012 | |

OTHER PUBLICATIONS

Indian Examination Report dated Jun. 3, 2020 for Indian Patent Application No. 201947001529, 4 pages.

* cited by examiner

POWER CAPACITOR MODULE WITH COOLING ARRANGEMENT

TECHNICAL FIELD

The present disclosure relates to power capacitors comprising a plurality of capacitor elements.

BACKGROUND

Power capacitor units, or high voltage capacitor units, typically comprise a casing and a plurality of capacitor elements arranged inside the casing and connected to busbar assemblies, which in turn are connected to bushings for leading current into and out from the casing.

Each capacitor element may consist of a few layers of insulating film such as polypropylene, which is wound together with aluminum foil. The aluminum foils work as electrodes and the film layers work as dielectric. Capacitor elements could alternatively consist of a few layers of metalized plastic film.

A large quantity of heat is generated inside the casing when a power capacitor is being operated. US 2014/334105 A1 discloses a capacitor packaging solution that incorporates both thermal and electrical considerations. A package can include capacitor elements electrically coupled to a busbar, and a thermally enhanced isolation layer between the busbar and a case. The isolation layer is provided adjacent a case base and sidewall portions. The busbar is disposed adjacent to the isolation layer and configured to extend along the package side and along the package length below the capacitor elements to provide an extended path for heat dissipation from the bus bar prior to its contact with capacitor elements. The enhanced isolation layer is configured to conduct heat away from the busbar to the case to avoid the hotspot temperature of the capacitor. The isolation layer provides electrical isolation between the busbar and the case, as well as provides a heat conducting medium that can improve the transfer of heat from the busbar to the case, and thus reduce the amount of heat transferred to the capacitor elements. The isolation layer comprises a thermally enhanced substance configured to improve heat dissipation. The isolation layer comprises an epoxy substance in which a thermally conductive filler, such as alumina filler, has been infused.

SUMMARY

Electrical characteristics, e.g., capacitance size, are typical performance parameters taken into account when designing a power capacitor unit. Such parameters may be dependent of the size or number of the capacitor elements.

By selecting a suitable number of layers of capacitor elements having a fixed predetermined height, better production flexibility may be provided, because less modification of the assembly line is required compared to the case when differently sized capacitor elements would have to be produced for differently rated power capacitor units. A one-sized capacitor element may thus be seen as a building block for creating power capacitor units with different performance ratings. Thus, instead of enlarging the size of each capacitor element for a higher performance power capacitor, which would require substantial modifications of the assembly line, additional capacitor elements may be stacked in layers to obtain the desired power capacitor performance.

Power capacitor units provided with more than one layer of capacitor elements however provides a challenge due to the additional heat generated by busbar assemblies arranged between the layers of capacitor elements.

The disclosure of US 2014/334105 A1 discloses only a single-layered capacitor, which provides heat conduction in the direction from the busbar towards the case, but it does not provide efficient heat conduction in the transverse direction, perpendicular to the heat transfer direction between the busbar and case.

In view of the above, a general object of the present disclosure is to provide a power capacitor unit which solves or at least mitigates the problem of the prior art.

There is hence provided a power capacitor unit comprising: a casing, a first layer of capacitor elements, a second layer of capacitor elements, wherein the first layer of capacitor elements are stacked on the second layer of capacitor elements, a first busbar assembly connected to the capacitor elements of the first layer, a second busbar assembly connected to the capacitor elements of the second layer, wherein the first busbar assembly and the second busbar assembly are arranged between the first layer of capacitor elements and the second layer of capacitor elements, a heat conducting layer provided between the first busbar assembly and the second busbar assembly, wherein the heat conducting layer is in thermal contact with the casing, thereby conducting heat from the first busbar assembly and the second busbar assembly to the casing, and wherein the casing is electrically insulated from the first busbar assembly and the second busbar assembly.

An effect obtainable thereby is that heat generated between the two layers of capacitor elements may be conducted away from this region to the casing for cooling of the power capacitor unit. The heat conducting layer provides heat conduction laterally in the plane defined by the heat conducting layer, out to the casing.

Furthermore, a power capacitor unit having two or more layers of capacitor elements can be designed with lower maximum temperature compared to the same MVAR or MJoule ratings with one layer of capacitor elements due to the heat conducting layer. A greater flexibility in the production can be obtained when it is possible to use a larger number of shorter capacitor elements instead of a smaller number of taller capacitor elements to design the power capacitor unit.

The heat dissipation from the first busbar assembly and the second busbar assembly is provided by means of a heat sink functionality of the heat conducting layer and the casing which is in thermal contact with the heat conducting layer. The majority of heat dissipated from the first busbar assembly and the second busbar assembly is thus provided by this heat sink functionality obtained due to the thermal contact between the heat conducting layer and the casing.

The heat conducting layer may according to one variation be solid. The heat conducting layer is in particular not hollow; it is for example not provided with any channels for carrying a coolant. The heat conducting layer may be monolithic.

According to one embodiment the heat conducting layer is formed by at least one sheet.

According to one embodiment the at least one sheet is one of an aluminum sheet, a copper sheet, and a plastic sheet comprising oxide particles.

According to one embodiment the at least one sheet has a sheet portion which protrudes from between the first layer of capacitor elements and second layer of capacitor elements and which sheet portion is folded to extend parallel, and in thermal contact, with a sidewall of the casing.

According to one embodiment the sheet portion is furthermore folded to extend parallel, and in thermal contact, with a wide wall of the casing, which wide wall is parallel with a surface defined by the heat conducting layer between the first layer of capacitor elements and the second layer of capacitor elements.

According to one embodiment the sheet portion extends along a majority of the length of the wide wall. By arranging the metal sheet with additional thermal contact with the casing, better heat dissipation may be obtained.

According to one embodiment the heat conducting layer is in direct contact with the casing.

One embodiment comprises a first insulation layer provided between and in thermal contact with the heat conducting layer and the first busbar assembly, which first insulation layer is configured to provide electrical insulation between the first busbar assembly and the heat conducting layer, and a second insulation layer provided between and in thermal contact with the heat conducting layer and the second busbar assembly, which second insulation layer is configured to provide electrical insulation between the second busbar assembly and the heat conducting layer. The casing is thereby electrically insulated from the first busbar assembly and the second busbar assembly, in particular in case that the heat conducting layer is a metal sheet.

If the heat conducting layer is both electrically insulating and heat conducting, e.g., in case the heat conducting layer is made of a plastic material comprising oxide particles interspersed therein, there is generally no need for additional electrical insulation layers other than the heat conducting layer itself in order to provide electrical insulation between the first busbar assembly, the second busbar assembly and the casing.

According to one embodiment the first insulation layer is in direct contact with the first busbar assembly and with the heat conducting layer.

According to one embodiment the second insulation layer is in direct contact with the second busbar assembly and with the heat conducting layer.

According to one embodiment the casing is composed of metal.

According to one embodiment the first insulation layer is formed by a polymer sheet.

According to one embodiment the second insulation layer is formed by a polymer sheet.

One embodiment comprises a third busbar assembly connected to the capacitor elements of the first layer and provided between the casing and the capacitor elements of the first layer, and a third insulation layer provided between the third busbar assembly and the casing for electrically insulating the casing from the third busbar assembly.

One embodiment comprises a fourth busbar assembly connected to the capacitor elements of the second layer and provided between the casing and the capacitor elements of the second layer, and a fourth insulation layer provided between the fourth busbar assembly and the casing for electrically insulating the casing from the fourth busbar assembly.

According to one embodiment the heat conducting layer is only arranged to cover a limited portion of the area between the first layer of capacitor elements and the second layer of capacitor elements, the heat conducting layer being provided only along two opposite lateral portions between the first layer of capacitor elements and the second layer of capacitor elements.

The casing may have a proximal end wall which contains the bushings and a distal end wall which is arranged opposite to the proximal end wall. The opposite lateral portions may extend in a direction from the proximal end wall towards the distal end wall.

Generally, all terms used in the claims are to be interpreted according to their ordinary meaning in the technical field, unless explicitly defined otherwise herein. All references to "a/an/the element, apparatus, component, means, etc.," are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

Figure 1:
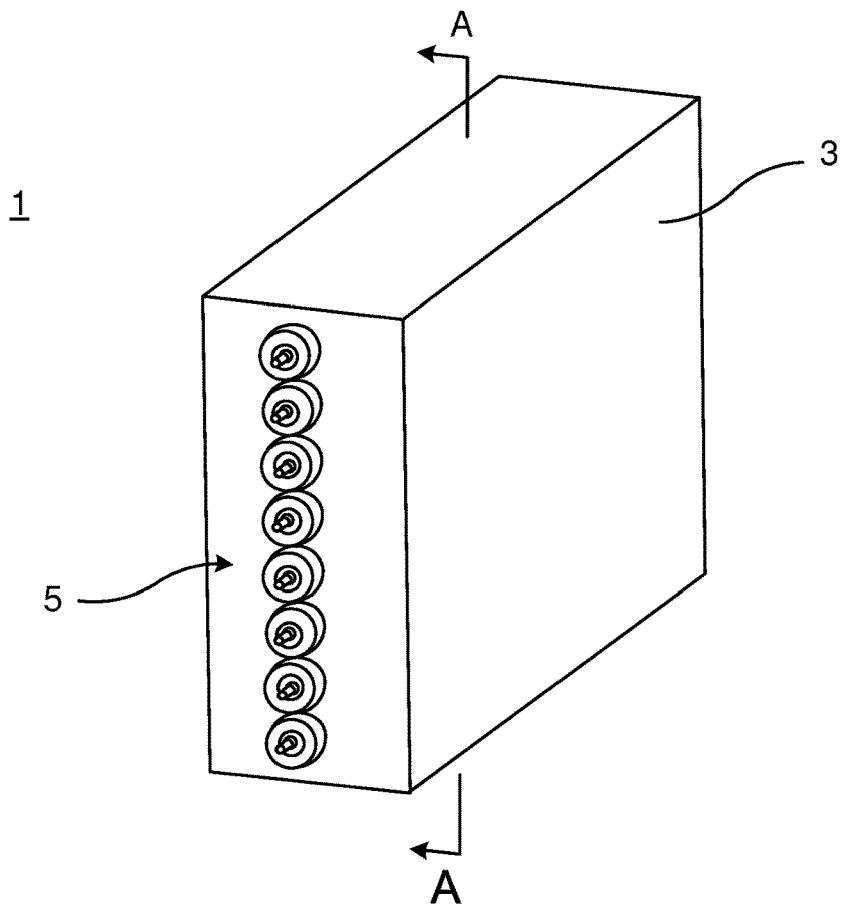
FIG. 1 schematically shows a perspective view of an example of a power capacitor unit.

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

The present disclosure relates to a power capacitor unit comprising a casing and two layers of capacitor elements arranged in a stacked manner. It should be noted that the power capacitor unit may comprise exactly two layers of capacitor elements, or more than two layers of capacitor elements, in which case the structure described below may be applied between each adjacent pair of layers of capacitor elements.

Each layer of capacitor elements comprises at least one, but typically a plurality of rows, and a plurality of columns of capacitor elements, arranged in a common plane.

The power capacitor unit also has a first busbar assembly connected to one layer of capacitor elements, providing an electrical connection to the capacitor elements, and a second busbar assembly connected to the other layer of capacitor elements, providing an electrical connection to the capacitor elements. The first busbar assembly and the second busbar assembly are arranged between the two layers of capacitor elements.

The power capacitor unit also includes a heat conducting layer arranged between the first busbar assembly and the second busbar assembly, i.e., between the two layers of capacitor elements. The casing is electrically insulated from the first busbar assembly and the second busbar assembly. This electrical insulation may for example be obtained by means of the inherent structure of the heat conducting layer, which according to one example may be made of one or more sheets of plastic material provided with a plurality of oxide particles dispersed therein for conducting heat while the plastic material also provides an adequate electrical insulation. In this case, the heat conducting layer may be arranged in direct contact with the first busbar assembly and the second busbar assembly.

Alternatively, the power capacitor unit may comprise a first insulation layer arranged between the heat conducting layer and the first busbar assembly, and a second insulation layer arranged between the heat conducting layer and the second busbar assembly. The first busbar assembly is arranged in thermal contact with the heat conducting layer, via the first insulation layer. The second busbar assembly is arranged in thermal contact with the heat conducting layer, via the second insulation layer.

The first insulation layer is configured to provide electrical insulation between the first busbar assembly and the heat conducting layer. The second insulation layer is configured to provide electrical insulation between the second busbar assembly and the heat conducting layer. The first insulation layer and the second insulation layer are preferably thin, for example in the order or 0.1-5 mm, such as 0.1-3 mm, for example 0.1-2 mm, to facilitate heat conduction to the heat conducting layer from the busbar assemblies.

There are hence a number of stacked layers between the two layers of capacitor elements. The layers are arranged in the following order, in the case of the presence of additional insulation layers. The first busbar assembly is arranged adjacent to the capacitor elements of the first layer, then follows the first insulation layer, the heat conducting layer, the second insulation layer, and the second busbar assembly arranged adjacent to the capacitor elements of the second layer.

The heat conducting layer is in thermal contact with the casing. Hereto, the heat conducting layer is configured to transfer heat from the first busbar assembly and the second busbar assembly arranged between the two layers of capacitor elements, to the casing for cooling the power capacitor unit.

FIG. 1 shows an example of a power capacitor unit 1. The power capacitor unit 1 may be a low voltage or a high voltage capacitor unit, either an AC type capacitor unit or a DC type capacitor unit.

The power capacitor unit 1 has a casing 3 and a plurality of bushings 5 extending through the casing 3 for connecting the power capacitor unit 1 to an electrical circuit. The casing 3 is preferably made of metal, for example steel such as stainless steel or carbon steel, aluminum or any other suitable metal material, or composite material.

Figure 2:
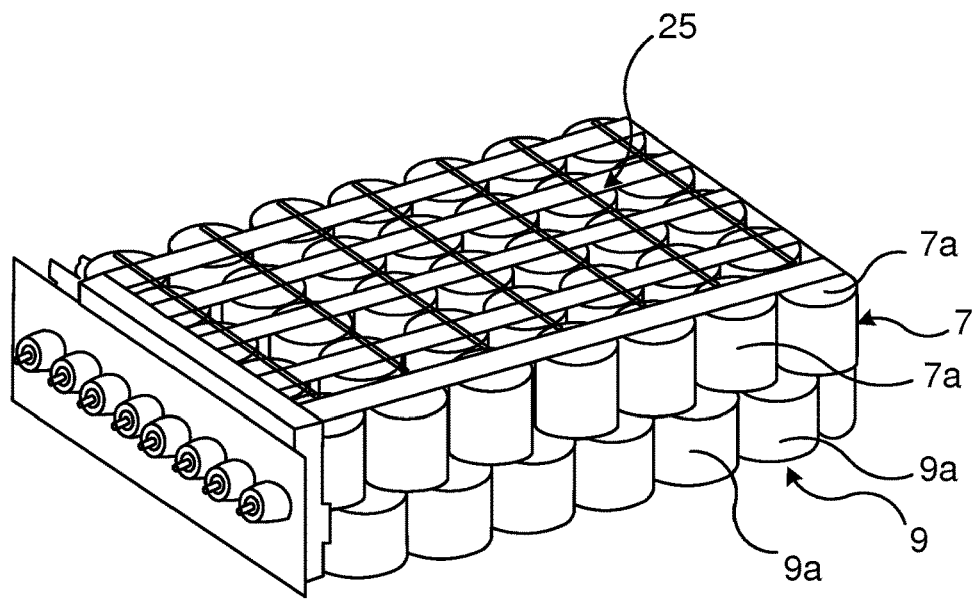
FIG. 2 schematically depicts a perspective view of a portion of the power capacitor unit in FIG. 1 with some internal components exposed.

FIG. 2 shows the power capacitor unit 1 with portions of the casing 3 removed to expose the interior of the power capacitor unit 1. It is to be noted that in this schematic drawing, the insulation layers and the heat conducting layer previously mentioned are not shown for reasons of clarity. As can be seen, the power capacitor unit 1 comprises a first layer 7 of capacitor elements 7a and a second layer 9 of capacitor elements 9a. A busbar assembly 25 is also shown arranged on top of the first layer 7 of capacitor elements 7a.

Figure 3:
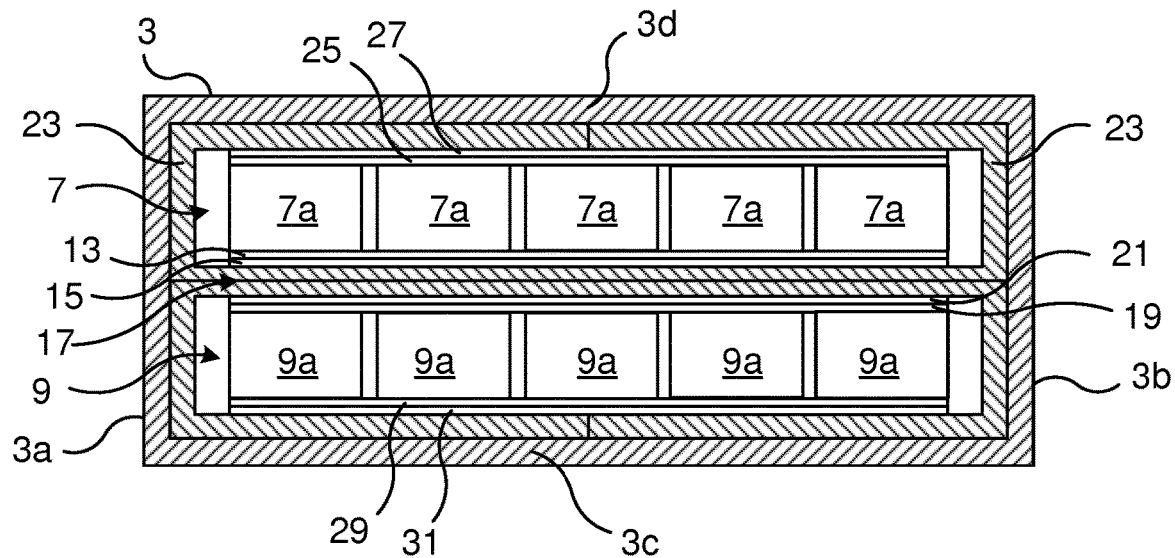
FIG. 3 is a cross-section along lines A-A of the power capacitor in FIG. 1 schematically showing one example of a heat conducting configuration of the power capacitor unit in FIG. 1.

Turning now to FIG. 3, an example of an internal configuration of the power capacitor unit 1 is shown, with a cross-section taken along lines A-A of FIG. 1. As can be seen each capacitor element 7a is stacked on a respective capacitor element 9a. The capacitor elements 7a thus form the first layer 7 of capacitor elements 7a and the capacitor elements 9a form the second layer 9 of capacitor elements 9a.

The power capacitor unit 1 comprises a first busbar assembly 13 extending along the capacitor elements 7a of the first layer 7 of capacitor elements 7a. The busbar assembly 13 provides an electrical connection to the capacitor elements 7a. The first busbar assembly 13 is furthermore connected to a bushing 5, shown in FIGS. 1 and 2, for leading current to or from the capacitor elements 7a of the first layer 7 of capacitor elements 7a.

The power capacitor unit 1 also comprises a first insulation layer 15 extending along the first busbar assembly 13. The first insulation layer 15 may for example be a polymer layer such as a polypropylene layer.

The power capacitor unit 1 furthermore comprises a second busbar assembly 19 extending along the capacitor elements 9a of the second layer 9 of capacitor elements 9a. The busbar assembly 19 provides an electrical connection to the capacitor elements 9a. The second busbar assembly 19 is connected to another bushing 5 for leading current to or from the capacitor elements 9a of the second layer 9 of capacitor elements 9a.

The power capacitor unit 1 also comprises a second insulation layer 21 extending along the second busbar assembly 19. The second insulation layer 21 may for example be a polymer sheet such as a polypropylene sheet.

The power capacitor unit 1 comprises a heat conducting layer 17 configured to lead heat away from the first busbar assembly 13 and from the second busbar assembly 21, via the first insulation layer 15 and the second insulation layer 21, to the casing 3.

The heat conducting layer 17 may be composed of one or more metal sheets, each metal sheet for example being a copper sheet or an aluminum sheet.

The first insulation layer 15 is configured to provide electrical insulation between the first busbar assembly 13 and the heat conducting layer 17. The second insulation layer 21 is configured to provide electrical insulation between the second busbar assembly 19 and the heat conducting layer 17.

The first insulation layer 15 and the second insulation layer 21 mainly conduct heat in directions perpendicular to the plane defined by the first insulation layer 15 and the second insulation layer 21. Hereto, the first insulation layer 15 conducts heat from the first busbar assembly 13 to the heat conducting layer 17 and the second insulation layer 21 conducts heat from the second busbar assembly 19 to the heat conducting layer 17. The heat conducting layer 17 conducts heat in directions parallel with the plane defined by the heat conducting layer 17, to the casing 3, in particular to the sidewalls 3a and 3b of the casing 3. The heat conducting layer 17 hence conducts heat laterally.

The heat conducting layer 17 has sheet portions 23 which protrude laterally from between the first layer 7 of capacitor elements 7a and the second layer 9 of capacitor elements 9a. In particular, each sheet portion 23 may be folded to extended parallel with a respective sidewall 3a, 3b. The sheet portions 23 are preferably arranged in thermal contact, for example in direct contact, with the sidewalls 3a, 3b so that heat may be transferred from the heat conducting layer 17 to the casing 3 in a more efficient manner. In order to obtain folding in both directions shown in FIG. 3, two stacked sheets may be used to form the heat conducting layer 17, with the lower sheet being folded downwards and the upper sheet being folded upwards. According to the example shown in FIG. 3, the sheet or sheets forming the heat conducting layer 17 are folded several times so that the sheet portion 23 extends parallel and in thermal contact, such as in direct contact, with the wide walls 3c and 3d arranged adjacent to the sidewalls 3a and 3b and parallel with the heat conducting layer 17 extending between the first layer 7 of capacitor elements 7a and the second layer 9 of capacitor elements 9a. Hereto, the sheet portion 23 may be configured to enclose the first layer 7 of capacitor elements 7a and the second layer 9 of capacitor elements 9a and extend along all of the four walls 3a-3d in a cross-section of the power capacitor unit 1.

The heat conducting layer 17 may according to one variation be arranged to cover essentially the entire surface formed between the first layer 7 of capacitor elements 7a and the second layer of capacitor elements 9a. According to another variation, the heat conducting layer 17 may be arranged to cover only the main hot spot region between the two layers 7 and 9 in which case the heat conducting layer 17 extends between the two sidewalls 3a and 3b, as shown in FIG. 3, but it does not extend all the way between the proximal end wall containing the bushings 5 and the distal end wall of the power capacitor unit 1. The hot spot region may be located centrally between the two sidewalls 3a and 3b of the casing 3, closer to the proximal end wall which contains the bushings 5 than to the distal end wall of the power capacitor unit 1.

The power capacitor unit 1 may furthermore comprise a third busbar assembly 25 connected to the capacitor elements 7a of the first layer 7. The third busbar assembly 25 may be provided at the opposite side of the capacitor elements 7a with respect to that side to which the first busbar assembly 13 is connected. The third busbar assembly 25 is furthermore connected to a bushing 5 to lead current to/from the capacitor elements 7a. In particular one of the busbar assemblies 13 and 25 is configured to lead current to the capacitor elements 7a and the other one is configured to lead current away from the capacitor elements 7a.

The power capacitor unit 1 may also have a third insulation layer 27 arranged between the casing 3 and the third busbar assembly 25 to provide electrical insulation between the casing 3 and the third busbar assembly 25. According to the example shown in FIG. 3, the sheet portion 23 extends along the wide wall 3d and is arranged between the wide wall 3d and the third insulation layer 27. Hereto, the third insulation layer 27 is configured to transfer heat from the third busbar assembly 25 to the sheet portion 23 arranged along the wide wall 3d.

The power capacitor unit 1 may furthermore comprise a fourth busbar assembly 29 connected to the capacitor elements 9a of the second layer 9. The fourth busbar assembly 29 may be provided at the opposite side of the capacitor elements 9a with respect to that side to which the second busbar assembly 19 is connected. The fourth busbar assembly 29 is furthermore connected to a bushing 5 to lead current to/from the capacitor elements 9a. In particular one of the busbar assemblies 19 and 29 is configured to lead current to the capacitor elements 9a and the other one is configured to lead current away from the capacitor elements 9a.

The power capacitor unit 1 may also have a fourth insulation layer 31 arranged between the casing 3 and the fourth busbar assembly 29 to provide electrical insulation between the casing 3 and the fourth busbar assembly 29.

According to the example shown in FIG. 3, the sheet portion 23 extends along the wide wall 3c and is arranged between the wide wall 3c and the fourth insulation layer 31. Hereto, the fourth insulation layer 31 is configured to transfer heat from the fourth busbar assembly 29 to the sheet portion 23 arranged along the wide wall 3c.

Figure 4:
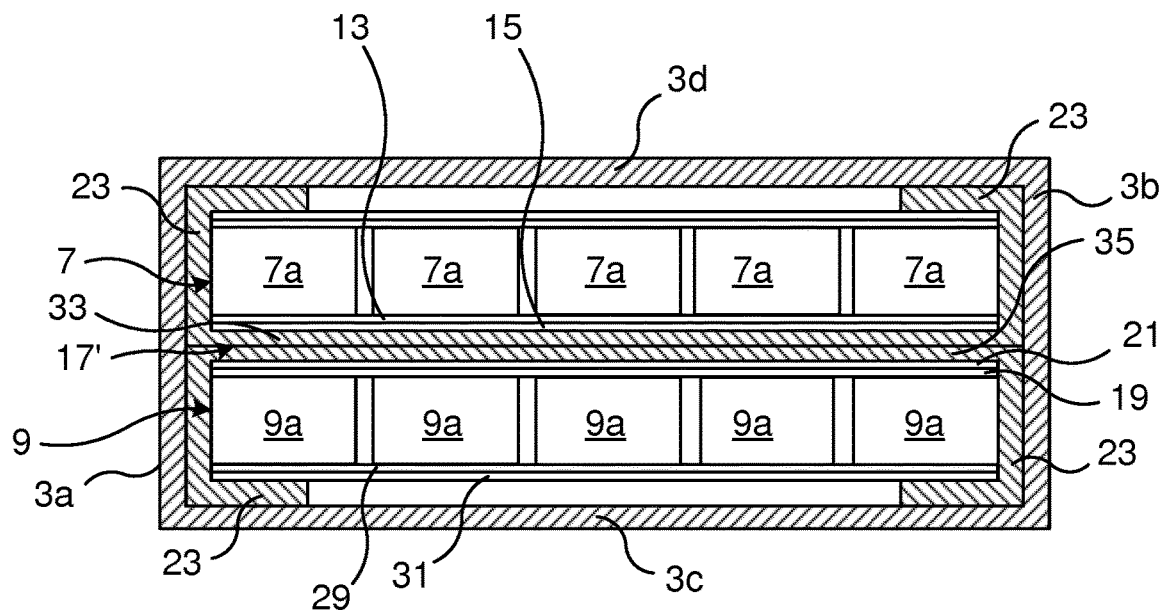
FIG. 4 is a cross-section along lines A-A of the power capacitor in FIG. 1 schematically showing another example of a heat conducting configuration of the power capacitor unit in FIG. 1.

FIG. 4 shows another example internal configuration of the power capacitor unit 1. This example is very similar to the example shown in FIG. 3, except that the heat conducting layer 17' has a slightly different configuration.

According to the example in FIG. 4, the heat conducting layer 17' includes sheets 33, 35 that are folded to extend along and in thermal contact with essentially the entire sidewalls 3a, 3b in a direction from one wide wall 3c to the other wide wall 3d. The sheets 33, 35 are furthermore folded to extend along and in thermal contact with only a portion of the respective wide walls 3c, 3d in a direction from one side wall 3a to the other side wall 3b.

Although not shown in the schematic drawing in FIG. 4, the third and fourth insulation layers 27 and 31 may be in contact with the respective wide wall 3c, 3d to thereby transfer heat from the third busbar assembly 25 and the fourth busbar assembly 29, respectively.

Figure 5:
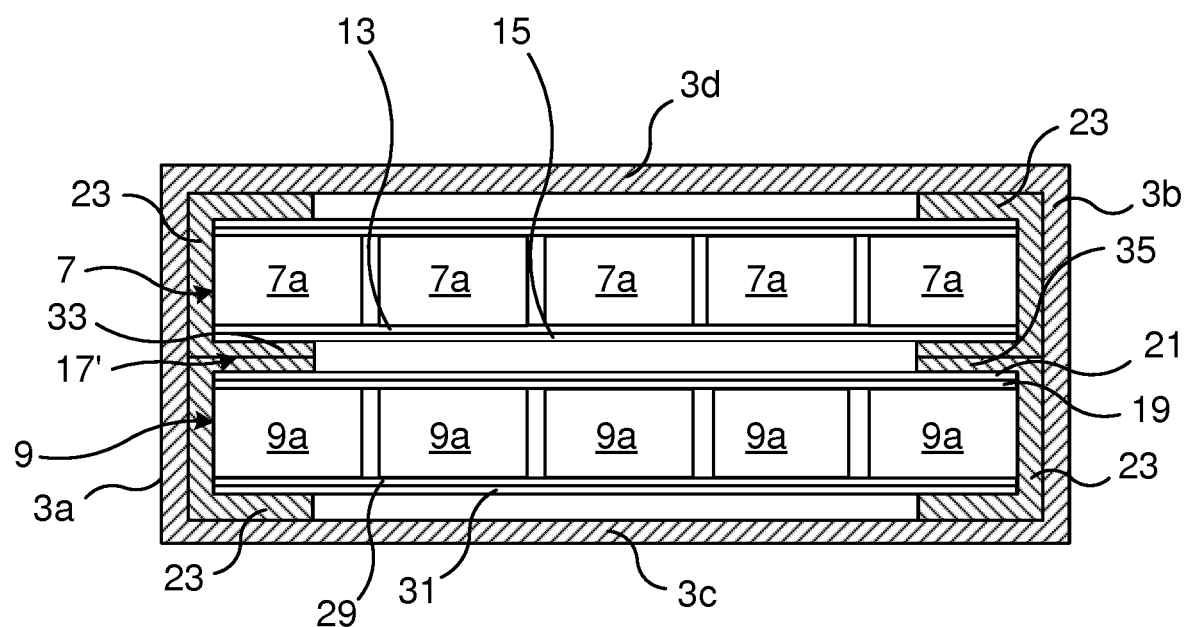
FIG. 5 is a cross-section along lines A-A of the power capacitor in FIG. 1 schematically showing another example of a heat conducting configuration of the power capacitor unit in FIG. 1.

According to the example in FIG. 5, the heat conducting layer 17' is only arranged to cover a limited portion of the area between the first layer 7 of capacitor elements 7a and the second layer 9 of capacitor elements 9a. In particular the heat conducting layer 17' may be formed by several metal sheets, namely at least a first sheet 33 provided only along a lateral portion between the first layer 7 of capacitor elements 7a and the second layer 9 of capacitor elements 9a, and at least a second sheet 35 provided only along an opposite lateral portion between the first layer 7 of capacitor elements 7a and the second layer 9 of capacitor elements 9a. Furthermore, the sheets 33, 35 are folded to extend along and in thermal contact with essentially the entire respective sidewalls 3a, 3b in a direction from one wide wall 3c to the other wide wall 3d. The sheets 33, 35 are furthermore folded to extend along and in thermal contact with only a portion of the respective wide walls 3c, 3d in a direction from one side wall 3a to the other side wall 3b. Alternatively, the sheets 33, 35 could be folded to extend along and in thermal contact with the entire respective wide walls 3c, 3d in a direction from one side wall 3a to the other side wall 3b. Each of the first busbar assembly and the second busbar assembly may for example comprise conductive strips arranged in a grid formation as shown in FIG. 2. Alternatively the first busbar assembly may comprise a conductive sheet configured to be connected to each capacitor element of the first layer of capacitor elements, and the second busbar assembly may comprise a conductive sheet configured to be connected to each capacitor element of the second layer of capacitor elements.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:
1. A power capacitor unit comprising:
a metal casing,
a first layer of capacitor elements,
a second layer of capacitor elements, wherein the first layer of capacitor elements is stacked on the second layer of capacitor elements, a first busbar assembly connected to the capacitor elements of the first layer, a second busbar assembly connected to the capacitor elements of the second layer, wherein the first busbar assembly and the second busbar assembly are arranged between the first layer of capacitor elements and the second layer of capacitor elements, a heat conducting layer provided between the first busbar assembly and the second busbar assembly, wherein the heat conducting layer is in direct thermal contact with the casing, thereby the heat conducting layer and the casing provide heat sink functionality for conducting heat from the first busbar assembly and the second busbar assembly to the casing for cooling the power capacitor unit, and wherein the casing is electrically insulated from the first busbar assembly and the second busbar assembly; and wherein the heat conducting layer is formed by at least one planar metal sheet that is separate from the casing and that extends between the first busbar assembly and the second busbar assembly.

2. The power capacitor unit as claimed in claim 1, further comprising a sheet portion in thermal contact with the planar metal sheet which protrudes from between the first layer of capacitor elements and second layer of capacitor elements, the sheet portion extending parallel, and in thermal contact, with a sidewall of the casing.

3. The power capacitor unit as claimed in claim 2, wherein the sheet portion extends parallel, and in thermal contact, with a wide wall of the casing, which wide wall is parallel with a surface defined by the heat conducting layer between the first layer of capacitor elements and the second layer of capacitor elements.

4. The power capacitor unit as claimed in claim 3, wherein the planar metal sheet extends along a majority of the length of the wide wall.

5. The power capacitor unit as claimed in claim 2, wherein the heat conducting layer comprises a folded metal sheet comprising the at least one planar metal sheet and the sheet portion.

6. The power capacitor as claimed in claim 1, comprising a first insulation layer provided between and in thermal contact with the heat conducting layer and the first busbar assembly, which first insulation layer is configured to provide electrical insulation between the first busbar assembly and the heat conducting layer, and a second insulation layer provided between and in thermal contact with the heat conducting layer and the second busbar assembly, which second insulation layer is configured to provide electrical insulation between the second busbar assembly and the heat conducting layer.

7. The power capacitor unit as claimed in claim 6, wherein the first insulation layer is in direct contact with the first busbar assembly and with the heat conducting layer.

8. The power capacitor unit as claimed in claim 7, wherein the second insulation layer is in direct contact with the second busbar assembly and with the heat conducting layer.

9. The power capacitor unit as claimed in claim 6, wherein the second insulation layer is in direct contact with the second busbar assembly and with the heat conducting layer.

10. The power capacitor unit as claimed in claim 6, wherein the first insulation layer is formed by a polymer sheet.

11. The power capacitor unit as claimed in claim 6, wherein the second insulation layer is formed by a polymer sheet.

12. The power capacitor unit as claimed in claim 1, further comprising a third busbar assembly connected to the capacitor elements of the first layer and provided between the casing and the capacitor elements of the first layer, and a third insulation layer provided between the third busbar assembly and the casing for electrically insulating the casing from the third busbar assembly.

13. The power capacitor unit as claimed in claim 1, further comprising a fourth busbar assembly connected to the capacitor elements of the second layer and provided between the casing and the capacitor elements of the second layer, and a fourth insulation layer provided between the fourth busbar assembly and the casing for electrically insulating the casing from the fourth busbar assembly.

14. The power capacitor unit as claimed in claim 1, wherein the heat conducting layer is only arranged to cover a limited portion of the area between the first layer of capacitor elements and the second layer of capacitor elements, the heat conducting layer being provided only along two opposite lateral portions between the first layer of capacitor elements and the second layer of capacitor elements.

15. The power capacitor unit as claimed in claim 1, wherein the casing forms a single space which contains all of the capacitor elements of the first layer and the second layer.

16. The power capacitor unit as claimed in claim 1, wherein the heat conducting layer comprises a folded metal sheet comprising the at least one planar sheet and a sheet portion in thermal contact with the planar metal sheet that protrudes from between the first layer of capacitor elements and the second layer of capacitor elements, the sheet portion extending parallel, and in thermal contact, with a sidewall of the casing, the sheet portion defining a portion of the at least one sheet that extends along said sidewall, the sheet portion being planar along its entire extension along said sidewall.

17. A power capacitor unit comprising:

a casing, a first layer of capacitor elements, a second layer of capacitor elements, wherein the first layer of capacitor elements is stacked on the second layer of capacitor elements, a first busbar assembly connected to the capacitor elements of the first layer, a second busbar assembly connected to the capacitor elements of the second layer, wherein the first busbar assembly and the second busbar assembly are arranged between the first layer of capacitor elements and the second layer of capacitor elements, a heat conducting layer provided between the first busbar assembly and the second busbar assembly, wherein the heat conducting layer is in thermal contact with the casing, thereby conducting heat from the first busbar assembly and the second busbar assembly to the casing, and wherein the casing is electrically insulated from the first busbar assembly and the second busbar assembly, and wherein the heat conducting layer is only arranged to cover a limited portion of the area between the first layer of capacitor elements and the second layer of capacitor elements, the heat conducting layer being provided only along two opposite lateral portions between the first layer of capacitor elements and the second layer of capacitor elements.

18. A power capacitor unit comprising:

a metal casing, a first layer of capacitor elements, a second layer of capacitor elements, wherein the first layer of capacitor elements is stacked on the second layer of capacitor elements, a first busbar assembly connected to the capacitor elements of the first layer, a second busbar assembly connected to the capacitor elements of the second layer, wherein the first busbar assembly and the second busbar assembly are arranged between the first layer of capacitor elements and the second layer of capacitor elements, a heat conducting layer provided between the first busbar assembly and the second busbar assembly, wherein the casing forms a single space which contains all of the capacitor elements of the first layer and the second layer, wherein the heat conducting layer is in direct thermal contact with the casing, thereby the heat conducting layer and the casing provide heat sink functionality for conducting heat from the first busbar assembly and the second busbar assembly to the casing for cooling the power capacitor unit, and wherein the casing is electrically insulated from the first busbar assembly and the second busbar assembly; and wherein the heat conducting layer is formed by at least one sheet that is separate from the casing.

19. The power capacitor unit as claimed in claim 18, wherein the at least one sheet has a sheet portion which protrudes from between the first layer of capacitor elements and second layer of capacitor elements and which sheet portion is folded to extend parallel, and in thermal contact, with a sidewall of the casing.

20. The power capacitor unit as claimed in claim 19, wherein the sheet portion is furthermore folded to extend parallel, and in thermal contact, with a wide wall of the casing, which wide wall is parallel with a surface defined by the heat conducting layer between the first layer of capacitor elements and the second layer of capacitor elements.

21. The power capacitor unit as claimed in claim 18, comprising a first insulation layer provided between and in thermal contact with the heat conducting layer and the first busbar assembly, which first insulation layer is configured to provide electrical insulation between the first busbar assembly and the heat conducting layer, and a second insulation layer provided between and in thermal contact with the heat conducting layer and the second busbar assembly, which second insulation layer is configured to provide electrical insulation between the second busbar assembly and the heat conducting layer.

* * * * *